United States Patent [19]
Chen et al.

[11] Patent Number: 5,639,531
[45] Date of Patent: Jun. 17, 1997

[54] PROCESS FOR MAKING A HYBRID CERAMIC ARTICLE

[75] Inventors: Otis Y. Chen; Harold M. Craig, both of West Hartford; Glenn M. Allen, Ellington; David C. Jarmon, Kensington, all of Conn.

[73] Assignee: United Technologies Corporation, Hartford, Conn.

[21] Appl. No.: 136,306

[22] Filed: Dec. 21, 1987

[51] Int. Cl.$^6$ .................................................. B32B 3/14
[52] U.S. Cl. ........................... 428/49; 428/99; 428/120; 264/332; 264/125
[58] Field of Search .................... 156/89; 264/332, 264/125; 428/426, 388, 376, 49, 120, 99

[56] References Cited

U.S. PATENT DOCUMENTS

| | | | |
|---|---|---|---|
| 1,917,964 | 7/1933 | Fuschi et al. | 264/332 |
| 2,135,118 | 11/1938 | Stewart | 52/390 |
| 2,360,479 | 10/1944 | Detrick et al. | 25/156 |
| 2,919,549 | 1/1960 | Haworth et al. | 60/39.65 |
| 3,041,785 | 7/1962 | MacDonald et al. | 52/390 |
| 3,179,724 | 4/1965 | Jones | 264/58 |
| 3,185,748 | 5/1965 | MacDonald et al. | 52/390 |
| 3,534,131 | 10/1970 | Gebler et al. | 264/57 |
| 3,672,032 | 6/1972 | Witherspoon | 269/7 |
| 3,790,152 | 2/1974 | Parsons | 269/7 |
| 3,918,255 | 11/1975 | Holden | 60/753 |
| 3,921,343 | 11/1975 | Speyer | 269/7 |
| 4,005,635 | 2/1977 | Feldcamp | 269/7 |
| 4,132,689 | 1/1979 | Speyer | 269/7 |
| 4,268,946 | 5/1981 | Eisenberg | 269/7 |
| 4,341,826 | 7/1982 | Prewo et al. | 428/35 |
| 4,428,763 | 1/1984 | Layden | 65/4.21 |
| 4,441,324 | 4/1984 | Abe et al. | 60/753 |
| 4,713,275 | 12/1987 | Riccitiello et al. | 428/76 |
| 4,719,151 | 1/1988 | Chyung et al. | 428/428 |
| 4,777,844 | 10/1988 | DeBell et al. | 74/579 R |

Primary Examiner—Charles T. Jordan
Assistant Examiner—Anthony R. Chi

[57] ABSTRACT

A process for making a hybrid ceramic article is disclosed. The process involves embedding an array of refractory ceramic tiles in a fiber reinforced glass-ceramic matrix composite substrate. The hybrid ceramic article so formed exhibits high thermal stability and elevated temperature load-bearing ability.

6 Claims, 1 Drawing Sheet

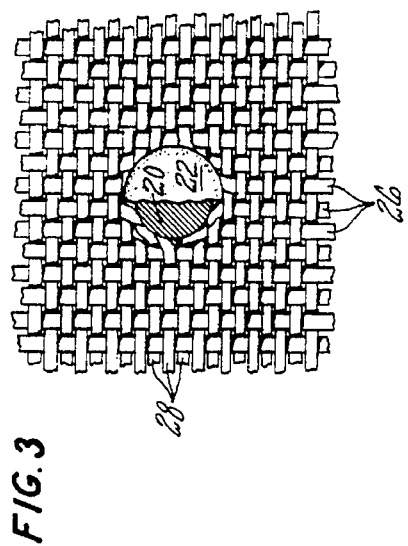
FIG. 3
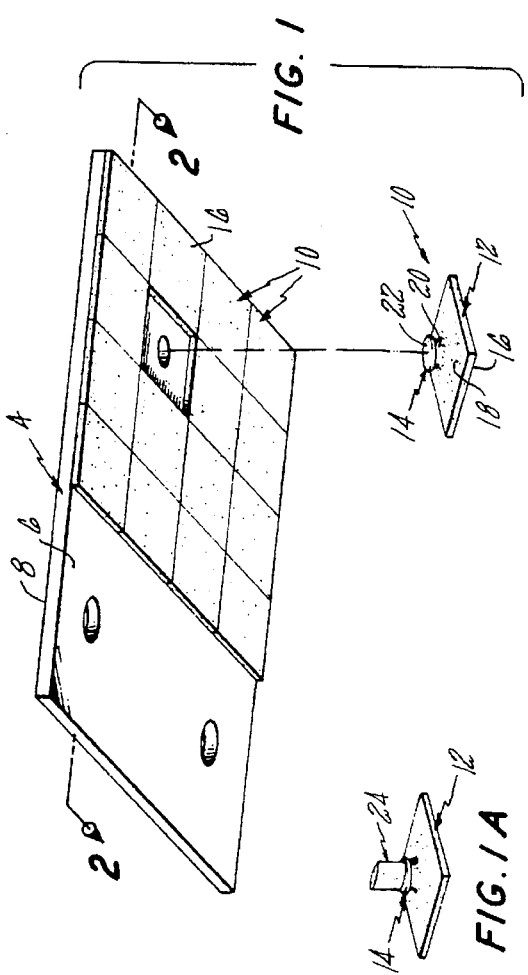
FIG. 1
FIG. 1A
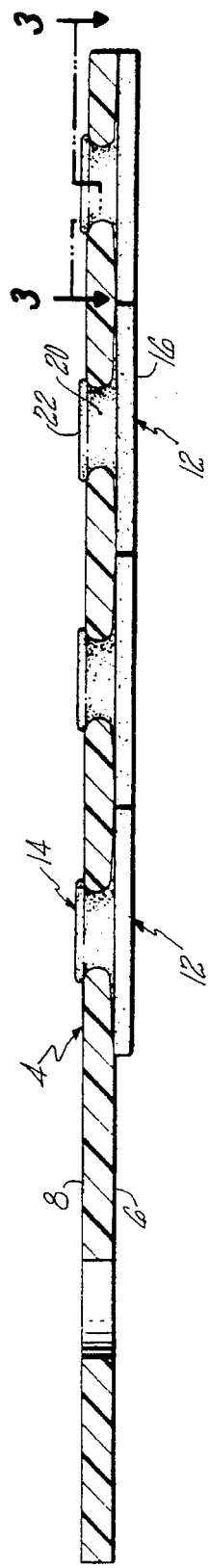
FIG. 2

PROCESS FOR MAKING A HYBRID CERAMIC ARTICLE

CROSS REFERENCE TO RELATED APPLICATION

This invention is related to the invention disclosed in copending patent application entitled "Hybrid Ceramic Article" (Attorney Docket No. EH-7879), filed by Harold M. Craig and Otis Y. Chen on even date and assigned to the same assignee as this application.

TECHNICAL FIELD

This invention relates to ceramic materials and articles made therefrom.

BACKGROUND ART

Ceramic materials are attractive materials for high temperature applications due to their characteristic high thermal stability. However, the use of ceramic materials in high temperature structural applications has been severely limited by factors including fabrication development problems, the lack of fracture toughness that characterizes ceramic materials, and the extreme sensitivity of ceramic materials to internal flaws, surface discontinuities, and contact stresses. Conventional ceramic materials are thus prone to catastrophic failure when subjected to thermal and mechanical stresses and not at all suitable for load-bearing applications.

What is needed in this art is a ceramic material which overcomes the problems discussed above.

DISCLOSURE OF THE INVENTION

A process for making a hybrid ceramic article for use in elevated temperature load-bearing applications is disclosed. The process comprises providing a plurality of refractory ceramic tiles, wherein each of the tiles includes a protective region and a supportive region, embedding the supportive region of each of the tiles in a layer of fibers, impregnating the layer of fibers with a glass matrix material, and consolidating the impregnated layer to form a hybrid ceramic article having an array of refractory ceramic tiles embedded in a fiber reinforced glass matrix substrate.

The foregoing and other features and advantages of the present invention will become more apparent from the following description and accompanying drawings.

BRIEF DESCRIPTION OF DRAWINGS

FIG. 1 shows a partially exploded perspective view of a hybrid ceramic thermal barrier.

FIG. 1A shows an alternative embodiment of a refractory ceramic tile.

FIG. 2 shows a cross section across line 2—2 of FIG. 1.

FIG. 3 shows a cross section across the line 3—3 of FIG. 2.

BEST MODE FOR CARRYING OUT THE INVENTION

BRIEF DESCRIPTION OF THE DRAWINGS

FIG. 1 shows a perspective view of a hybrid ceramic thermal barrier. The thermal barrier 2 includes a fiber reinforced glass matrix substrate 4 which has a proximal surface 6 and a distal surface 8, and an array of refractory ceramic tiles 10 embedded in the substrate 4 and substantially covering the proximal surface 6. A tile 10 is shown in the exploded portion of FIG. 1. The tile includes a protective region 12 and a supportive region 14. The protective region 12 includes a proximal surface 16 for orienting toward a heat source and an opposite distal surface 18. The supportive region 14 extends perpendicularly from the distal surface 18 and includes a stem 20 and a broadened head 22.

FIG. 1A shows an alternative embodiment of the refractory ceramic tile of the present invention and further includes a heat exchange region 24 extending from the supportive region 14. The heat exchange region 24 extends from the distal surface 8 of the substrate 4 for contact with a stream of coolant.

FIG. 2 shows a cross section along line 2—2 in FIG. 1. The protective region 12 of each tile covers a portion of the proximal surface 6 of the substrate. The stem 20 of the supportive region 18 of each tile 10 is embedded in the fiber reinforced glass matrix composite substrate 4 and the head 22 of the supportive region 14 of each tile 10 extends slightly beyond the distal surface 8 of the substrate 4 to secure the tile 10 to the substrate 4.

FIG. 3 shows a cross section across line 3—3 of FIG. 1. A cross section of the stem 20 is shown embedded between the continuous warp fibers 26 and the continuous woof fibers 28 of a woven fiber reinforced glass matrix composite substrate 4.

The matrix of the present invention may comprise any glass or glass ceramic material that exhibits resistance to elevated temperature and is thermally and chemically compatible with the fiber reinforcement of the present invention. The term "glass-ceramic" is used herein to denote materials which may, depending on processing parameters, comprise only a glassy phase or may comprise both a glassy phase and a ceramic phase. By resistance to elevated temperature is meant that a material does not substantially degrade within the temperature range of interest and that the material retains a high proportion of its room temperature physical properties within the temperature range of interest. A glass matrix material is regarded as chemically compatible with the fiber reinforcement if it does not react to substantially degrade the fiber reinforcement during processing. A glass matrix material is regarded herein as thermally compatible with the fiber reinforcement if the coefficient of thermal expansion (CTE) of the glass matrix and the CTE of the fiber reinforcement are sufficiently similar that differential thermal expansion of the fiber reinforcement and the matrix during thermal cycling does not result in delamination of the fiber reinforced glass matrix composite substrate of the present invention. Borosilicate glass (e.g. Corning Glass Works (CGW) 7740) aluminosilicate glass (e.g. CGW 1723) and high silica glass (e.g. CGW 7930) as well as mixtures of glass are examples of suitable glass matrix materials. Suitable matrices may be based on glass-ceramic compositions such as lithium aluminosilicate (LAS) magnesium aluminosilicate (MAS), calcium aluminosilicate (CAS), on combinations of glass-ceramic materials or on combinations of glass materials and glass-ceramic materials. The choice of a particular matrix material is based on the anticipated demands of the intended application. For applications in which exposure to temperatures greater than about 500° C. is anticipated, lithium aluminosilicate silicate is the preferred matrix material. Preferred lithium aluminosilicate silicate glass ceramic matrix compositions are disclosed in commonly assigned U.S. Pat. Nos. 4,324,843 and 4,485,179, the disclosures of which are incorporated by reference.

While glass or glass ceramic matrix materials are preferred, it will be appreciated by those skilled in the art that ceramic matrix materials, such as SiC or $Si_3N_4$ may also be suitable matrix materials for some applications. Ceramic matrices may be fabricated by such conventional processes as chemical vapor infiltration, sol-gel processes and the pyrolysis of organic precursor materials.

The fiber reinforcement of the present invention may comprise any fiber that exhibits high tensile strength and high tensile modulus at elevated temperatures. Suitable fibers include silicon carbide (SIC) fibers, silicon nitride ($Si_3N_4$) and refractory metal oxide fibers. Silicon carbide fibers and silicon nitride fibers are preferred. Nicalon® ceramic grade fiber (Nippon Carbon Co.) is a silicon carbide fiber that has been found to be especially suitable for use with the present invention. Nicalon® ceramic grade fiber is available as a multifilament silicon carbon yarn with an average fiber diameter of about 10 microns. The average strength of the fiber is approximately 300,000 psi and the average elastic modulus is approximately $32 \times 10^6$ psi.

The fiber reinforcement and the glass ceramic matrix of the present invention are combined so as to produce a fiber reinforced glass ceramic matrix composite substrate 4 which exhibits a high load bearing ability at elevated temperatures, high resistance to thermal and mechanical shock, high resistance to fatigue, as well as thermal compatibility with the refractory ceramic tiles of the present invention. It is preferred that the fiber reinforcement comprises a volume fraction of between about 20% and about 60% of the fiber reinforced glass ceramic matrix composite substrate. It is difficult to obtain a proper distribution of fibers if the volume fraction of fibers is below 20%, and the shear properties of the glass ceramic matrix composite material are greatly reduced if the volume fraction of fiber exceeds about 60%. It is most preferred that the fiber reinforcement comprises a volume fraction between about 35% and about 50% of the fiber reinforced glass matrix composite substrate.

The refractory ceramic tile 10 of the present invention may comprise any ceramic material that exhibits high flexural strength, oxidation resistance, high resistance to thermal shock, and has a CTE in the range that may be matched to the fiber reinforced glass ceramic matrix composite substrate of the present invention. Silicon carbide, silicon nitride, alumina, and zirconia are preferred refractory ceramic tile materials. Silicon carbide and silicon nitride are the most preferred refractory ceramic tile materials.

The refractory ceramic tile 10 of the present invention may be fabricated by conventional means as, for example, hot pressing, cold pressing, injection molding, slip casting or hot isostatic pressing, provided the fabrication process is carefully controlled to minimize flaw formation and to enhance the reliability of the tiles. It should be noted that fabrication processes influence the physical properties as well as the shape of the tile (e.g. the highest strength typically occurs with hot pressed material, and the lowest with injection molded material). Hot pressed and machined tiles offer the most flexibility for development purposes. Slip casting and injection molding offer greater opportunities for cost reduction in a production environment.

The hybrid ceramic thermal barrier 2 of the present invention is formed by embedding the supportive region 14 of each of an array of refractory ceramic tiles 10 in a fiber layer that is impregnated with the glass ceramic matrix material, and consolidating the fiber layer and glass matrix material to form a fiber reinforced glass ceramic matrix composite substrate 4 around the supportive regions of the tiles. The supportive regions of the refractory ceramic tiles may be embedded in the fiber layer either before or after the fiber layer is impregnated with the glass ceramic matrix material.

For example, as in the preferred embodiment shown in the Figures, the substrate 4 may be formed by laying up plies of woven fiber that have been impregnated with a powdered glass or glass-ceramic matrix composition as discussed and commonly assigned U.S. Pat. No. 4,341,826, the disclosure of which is incorporated herein by reference. The supportive region 14 of each tile 10 is preferably forced between the fibers of each ply of the woven fiber reinforcement. Alternatively, holes to accommodate the supportive regions of the tiles may be produced in the woven fiber plies before layup.

The laid up plies are then consolidated by, for example, hot pressing, vacuum hot pressing or hot isostatic pressing. For example, LAS impregnated plies may be consolidated by vacuum hot pressing at temperatures between about 1200° C. and 1500° C. at pressures between 250 psi to 5000 psi for a time period between about 2 minutes to about 1 hour, wherein a shorter time period would typically correspond to a higher temperature and pressure.

Alternatively, the fiber layer may be built up around the supportive region 14 of each tile 10 from unimpregnated fiber. The fiber layer may then be impregnated, and the glass impregnated fiber layer may be consolidated by the matrix transfer process described in commonly owned U.S. Pat. No. 4,428,763, the disclosure of which is incorporated herein by reference. The article so produced may be further consolidated by vacuum hot pressing as discussed above.

If a glass-ceramic matrix material is used and glass-ceramic matrix is desired, the article may then be heated to a temperature between about 800° C. to about 1200° C. for a time period of between about 2 hours to about 48 hours, preferably in an inert atmosphere, to partially crystallize the matrix.

It should be noted that in the design of the hybrid ceramic thermal barrier 2 of the present invention, it is extremely important to consider the potential affects of differential thermal expansion of the elements of the liner panel. Tailoring of the thermal coefficient of expansion of the composite substrate may be achieved by judicious choices of fiber and matrix materials and of the proportion in which they are combined. The coefficient of thermal expansion (CTE) must be traded off against other properties in fabricating the composite substrate.

A preferred technique for precisely positioning the area of tiles comprises bonding the array to a sheet of metal foil. Each tile of the array is selectively positioned and secured to the foil by an adhesive. Molybdenum metal foil is preferred because of its high temperature resistance. A viscous graphite adhesive, available from Cotronics Corporation is preferred because of its low curing temperature and high temperature strength. The graphite adhesive is cured by heating, for example at 266° F. for 16 hours. After the adhesive is cured the tiles are embedded in the glass ceramic matrix impregnated fiber layer and the substrate is consolidated as discussed above. The graphite adhesive has sufficient temperature resistance to withstand the consolidation process, provided the process is carried out in an inert atmosphere. After consolidation the graphite adhesive is removed by heating in air, for example at 1100° F. for 1.5 hours.

EXAMPLE 1

SiC tiles (Sohio and Norton Co.) were machined to a configuration similar to that shown in FIG. 3. The tiles were arranged in a graphite mold. The protruding supportive region on each tile was forced between the fibers of four layers of woven Nicalon cloth. A slurry of LAS glass powder was poured over the assembly. The substrate was consolidated using the matrix transfer method and vacuum hot pressing at 1000 psi and 2462° F.

EXAMPLE 2

Nine tiles were secured at predetermined locations on a molybdenum foil using graphite adhesive. The adhesive was cured at 266° F. for 16 hours. The assembly was placed in a graphite mold and embedded in a fiber reinforced glass matrix substrate by the method of Example 1. After consolidation of the glass substrate, the graphite adhesive was removed by a burnout cycle of 1100° F. for 1.5 hours in air.

The hybrid ceramic article of the present invention allows the beneficial properties of monolithic ceramics to be exploited while overcoming the detrimental properties of such materials.

The brittle failure mechanism which characterizes conventional ceramic materials is associated with randomly distributed flaws in the material. The probability of failure increases with the volume of a ceramic structure, as increasing the volume under stress increases the probability that a flaw is included in the volume. The present invention involves a reliable, economical means to mount an array of individual ceramic tiles to form a refractory load bearing structure. The small volume of the individual tiles makes the failure of each particular tile less probable. The stresses to which the tiles are subjected may be reduced by matching the CTE of the tile and substrate materials.

The process of the present invention enables the fabrication of hybrid ceramic articles which exhibit some physical properties which are typically associated with monolithic ceramic materials, e.g. resistance to elevated temperature, high thermal conductivity and low electrical conductivity, yet may be used in load bearing structural applications in which the use of conventional ceramic materials is not feasible. Load-bearing applications are applications in which an article is subjected to mechanical stress. While hybrid ceramic articles made by the present invention have been discussed in terms of an exemplary heat shield embodiment, it will be appreciated by those skilled in the art that such articles may be used in other applications, particularly load-bearing structural applications, which require ceramic-like physical properties as well as high fracture toughness.

Although this invention has been shown and described with respect to detailed embodiments thereof, it will be understood by those skilled in the art that various changes in form and detail thereof may be made without departing from the spirit and scope of the claimed invention.

We claim:

1. A process for making a hybrid ceramic article, comprising:

providing a plurality of refractory ceramic tiles, said tiles each having a protective region for covering a substrate and a supportive region extending from the protective region for securing the tile to the substrate, embedding the supportive region of each of the refractory ceramic tiles in a layer of fibers, impregnating the layer of fibers with a glass or glass ceramic matrix material to form an impregnated fiber layer, consolidating the impregnated fiber layer to form the substrate, said hybrid ceramic article having an array of refractory ceramic tiles embedded in a fiber reinforced glass ceramic matrix substrate and said hybrid ceramic article exhibiting high thermal stability and elevated temperature load-bearing ability.

2. The process of claim 1, wherein the layer of fibers, a stack of woven fiber cloth and the supportive regions of the refractory ceramic tiles are embedded by forcing the supportive region of the refractory ceramic tiles between the fibers of the woven fiber cloth.

3. The process of claim 1 wherein the layer of fibers is impregnated with matrix material by applying a slurry of glass or glass-ceramic powder to the fibers prior to embedding the supportive regions of the tiles.

4. The process of claim 1 wherein the layer of fibers is impregnated by transfer of the glass or glass ceramic matrix material into the fiber layer after embedding the supportive regions of the tiles.

5. The process of claim 1, additionally comprising:

bonding an array of selectively positioned refractory ceramic tiles to a sheet of metal foil with an adhesive prior to embedding the supportive region of each of the tiles in a layer of fiber, and heating the thermal barrier in air after consolidating the glass impregnated fiber layer to decompose the adhesive and disbond the array of selectively positioned refractory ceramic tiles from the sheet of metal foil.

6. A hybrid ceramic article, made by the process of claim 1.

* * * * *